United States Patent
Martin et al.

(10) Patent No.: US 9,202,095 B2
(45) Date of Patent: Dec. 1, 2015

(54) PISTOL GRIP ADAPTER FOR MOBILE DEVICE

(71) Applicant: Symbol Technologies, Inc., Schaumburg, IL (US)

(72) Inventors: Richard M. Martin, New Hyde Park, NY (US); Jaeho Choi, Whitestone, NY (US); Ian R. Jenkins, Stony Brook, NY (US); Chandra M. Nair, Mount Sinai, NY (US); Konstantinos D. Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 73 days.

(21) Appl. No.: 13/676,693

(22) Filed: Nov. 14, 2012

(65) Prior Publication Data

US 2014/0018128 A1    Jan. 16, 2014

Related U.S. Application Data

(60) Provisional application No. 61/741,163, filed on Jul. 13, 2012.

(51) Int. Cl.
| | |
|---|---|
| *G06K 7/10* | (2006.01) |
| *H04M 1/11* | (2006.01) |
| *G06K 7/00* | (2006.01) |

(Continued)

(52) U.S. Cl.
CPC ............ *G06K 7/1091* (2013.01); *G06F 1/1632* (2013.01); *G06K 7/0004* (2013.01); *G06K 7/01* (2013.01); *G06K 7/015* (2013.01); *G06K 7/10* (2013.01); *G06K 7/10009* (2013.01); *G06K 7/10386* (2013.01); *G06K 7/10554* (2013.01); *G06K 7/10881* (2013.01); *G06K 7/14* (2013.01);

(Continued)

(58) Field of Classification Search
USPC ........................................ 455/572, 573, 575.1
See application file for complete search history.

(56) References Cited

U.S. PATENT DOCUMENTS

| | | |
|---|---|---|
| 4,097,133 A | 6/1978 | Stemme et al. |
| 4,282,425 A | 8/1981 | Chadima et al. |

(Continued)

FOREIGN PATENT DOCUMENTS

| | | |
|---|---|---|
| EP | 1225501 | 7/2002 |
| GB | 2299394 A | 10/1996 |

(Continued)

OTHER PUBLICATIONS

Non Final Office Action mailed Aug. 22, 2013 in U.S. Appl. No. 131685,750, Richard M Martin, filed Nov. 22, 2012.

(Continued)

*Primary Examiner* — Daniel Lai

(57) ABSTRACT

An adapter for a mobile device is described. The adapter includes a handle portion having a trigger switch that is accessible to an index finger of a hand of the user when the handle portion is held in the hand of the user. A cradle portion is positioned above the handle portion for receiving at least a portion of the mobile device such that a plane of a display of the mobile device is substantially aligned with a long axis of the handle portion and the display is viewable by the user when the mobile device is positioned in the cradle portion and the handle portion is held in the hand of the user. A data acquisition device is coupled to the cradle portion. The data acquisition device acquires data from an object upon actuation of the trigger switch.

17 Claims, 4 Drawing Sheets

(51) Int. Cl.
*G06K 7/01* (2006.01)
*G06K 7/015* (2006.01)
*G06K 7/14* (2006.01)
*G06F 1/16* (2006.01)
*G06K 9/22* (2006.01)

(52) U.S. Cl.
CPC .............. *G06K 9/228* (2013.01); *H04M 1/11* (2013.01); *Y10T 29/49117* (2015.01)

(56) References Cited

U.S. PATENT DOCUMENTS

| | | | |
|---|---|---|---|
| 5,035,181 A | 7/1991 | Jacks et al. | |
| 5,204,531 A | 4/1993 | Elings et al. | |
| 5,250,790 A | 10/1993 | Melitsky et al. | |
| 5,340,972 A | 8/1994 | Sandor | |
| 5,349,497 A | 9/1994 | Hanson et al. | |
| 5,382,784 A | 1/1995 | Eberhardt | |
| 5,477,044 A | 12/1995 | Aragon | |
| 5,736,726 A * | 4/1998 | VanHorn et al. | 235/472.02 |
| 5,770,848 A | 6/1998 | Oizumi et al. | |
| 5,801,918 A | 9/1998 | Ahearn et al. | |
| 5,828,052 A | 10/1998 | Reynolds et al. | |
| 5,837,990 A | 11/1998 | Shepard | |
| 5,905,248 A | 5/1999 | Russell et al. | |
| 5,970,184 A | 10/1999 | Katoh et al. | |
| 6,056,199 A | 5/2000 | Wiklof et al. | |
| 6,085,981 A | 7/2000 | Knowles et al. | |
| 6,115,025 A | 9/2000 | Buxton et al. | |
| 6,184,654 B1 | 2/2001 | Bachner, III et al. | |
| 6,223,987 B1 | 5/2001 | Knowles et al. | |
| 6,286,760 B1 | 9/2001 | Schmidt et al. | |
| 6,394,355 B1 | 5/2002 | Schlieffers et al. | |
| 6,421,234 B1 | 7/2002 | Ricks et al. | |
| 6,502,754 B1 | 1/2003 | Bhatia et al. | |
| 6,518,952 B1 | 2/2003 | Leiper | |
| 6,575,369 B1 | 6/2003 | Knowles et al. | |
| 6,607,134 B1 | 8/2003 | Bard et al. | |
| 6,648,229 B1 | 11/2003 | Knowles et al. | |
| 6,726,070 B2 | 4/2004 | Lautner | |
| 6,754,069 B2 | 6/2004 | Harada | |
| 6,844,869 B1 * | 1/2005 | Kukita | 345/157 |
| 6,853,293 B2 | 2/2005 | Swartz et al. | |
| 7,065,299 B2 | 6/2006 | Schluter et al. | |
| 7,147,162 B2 | 12/2006 | Fitch et al. | |
| 7,157,705 B2 | 1/2007 | Hamrelius et al. | |
| 7,191,947 B2 | 3/2007 | Kahn et al. | |
| D540,838 S | 4/2007 | Aronsson et al. | |
| 7,250,603 B1 | 7/2007 | Nugent | |
| 7,389,933 B2 | 6/2008 | Wang | |
| D583,263 S | 12/2008 | Sebban | |
| 7,490,776 B2 | 2/2009 | Thuries | |
| 7,562,824 B2 | 7/2009 | Bhatia et al. | |
| 7,566,009 B2 | 7/2009 | Lapstun et al. | |
| 7,746,511 B2 | 6/2010 | Hamilton et al. | |
| 7,748,632 B2 | 7/2010 | Coleman et al. | |
| 7,764,488 B2 | 7/2010 | Calvarese | |
| 7,867,019 B1 | 1/2011 | Loukusa et al. | |
| 7,886,377 B2 | 2/2011 | Hamberg et al. | |
| D658,222 S | 4/2012 | Elrod et al. | |
| D665,440 S | 8/2012 | Sigward | |
| 8,255,836 B1 | 8/2012 | Gildfind | |
| D668,561 S | 10/2012 | Dunkin et al. | |
| 8,825,516 B2 | 9/2014 | Grant et al. | |
| 2002/0099894 A1 * | 7/2002 | Kehoe et al. | 710/300 |
| 2002/0140668 A1 | 10/2002 | Crawford | |
| 2002/0165436 A1 | 11/2002 | Schluter et al. | |
| 2003/0179178 A1 | 9/2003 | Zargham | |
| 2004/0129903 A1 | 7/2004 | Diamantstein et al. | |
| 2005/0001036 A1 | 1/2005 | Blake et al. | |
| 2005/0117624 A1 | 6/2005 | Hollander et al. | |
| 2006/0105722 A1 * | 5/2006 | Kumar | 455/90.3 |
| 2006/0138232 A1 | 6/2006 | Hammerslag et al. | |
| 2006/0197753 A1 | 9/2006 | Hotelling | |
| 2006/0221363 A1 | 10/2006 | Roth et al. | |
| 2006/0229034 A1 * | 10/2006 | Gizis et al. | 455/95 |
| 2007/0067745 A1 | 3/2007 | Choi et al. | |
| 2007/0131774 A1 | 6/2007 | Celestini | |
| 2008/0078839 A1 | 4/2008 | Barkan | |
| 2008/0105747 A1 | 5/2008 | Orlassino | |
| 2008/0116093 A1 | 5/2008 | Felten et al. | |
| 2008/0116271 A1 | 5/2008 | Holz et al. | |
| 2008/0128492 A1 | 6/2008 | Roth et al. | |
| 2008/0128499 A1 | 6/2008 | Chen et al. | |
| 2008/0128512 A1 | 6/2008 | Schmidt et al. | |
| 2008/0144696 A1 | 6/2008 | Bruggeman et al. | |
| 2008/0163504 A1 | 7/2008 | Smith | |
| 2009/0033633 A1 | 2/2009 | Newman | |
| 2009/0039162 A1 | 2/2009 | Yen | |
| 2009/0102925 A1 | 4/2009 | Sheard | |
| 2009/0108076 A1 | 4/2009 | Barkan et al. | |
| 2009/0116018 A1 | 5/2009 | Austin et al. | |
| 2009/0172591 A1 | 7/2009 | Pomper | |
| 2009/0224039 A1 | 9/2009 | Hause et al. | |
| 2009/0257469 A1 | 10/2009 | Jones et al. | |
| 2009/0266899 A1 | 10/2009 | Yoshizawa | |
| 2009/0289116 A1 | 11/2009 | Copeland et al. | |
| 2009/0307634 A1 | 12/2009 | Strandell | |
| 2010/0026498 A1 | 2/2010 | Bellows et al. | |
| 2010/0037184 A1 | 2/2010 | Sie | |
| 2010/0046577 A1 | 2/2010 | Sheard | |
| 2010/0096461 A1 | 4/2010 | Kotlarsky et al. | |
| 2010/0148066 A1 | 6/2010 | Stratmann et al. | |
| 2010/0171021 A1 | 7/2010 | Smith | |
| 2010/0277506 A1 | 11/2010 | Yao | |
| 2011/0075339 A1 | 3/2011 | Lam | |
| 2011/0121075 A1 | 5/2011 | Bellows et al. | |
| 2011/0164056 A1 | 7/2011 | Ording et al. | |
| 2011/0180600 A1 | 7/2011 | Wang et al. | |
| 2011/0246336 A1 | 10/2011 | Callaghan | |
| 2011/0290886 A1 | 12/2011 | Carlson | |
| 2011/0290889 A1 | 12/2011 | Tamburrini et al. | |
| 2012/0314083 A1 | 12/2012 | Ratliff et al. | |
| 2014/0014725 A1 | 1/2014 | Martin et al. | |
| 2014/0014726 A1 | 1/2014 | Tsiopanos et al. | |
| 2014/0014727 A1 | 1/2014 | Choi et al. | |

FOREIGN PATENT DOCUMENTS

| | | | |
|---|---|---|---|
| GB | 2358336 A | 7/2001 | |
| GB | 2396728 A | 6/2004 | |
| WO | 9314472 A1 | 7/1993 | |
| WO | 127735 A1 | 4/2001 | |
| WO | 2004066615 A1 | 8/2004 | |
| WO | 2007061498 A2 | 5/2007 | |

OTHER PUBLICATIONS

Leenes R., et al., "PRIME white paper," EU Project Prime, Privacy and Identity Management for Europe, Third and Final Version, May 15, 2008, 22 pages.

Final Office Action mailed Jan. 16, 2014 in U.S. Appl. No. 13/685,750, Richard M Martin, filed Nov. 22, 2012.

Non Final Office Action mailed Nov. 29, 2013 in U.S. Appl. No. 13/721,575, Jaeho Choi, filed Dec. 20, 2012.

International Search Report and Written Opinion for counterpart International Patent Application No. PCT/US2013/049945 mailed Oct. 10, 2013.

* cited by examiner

PISTOL GRIP ADAPTER FOR MOBILE DEVICE

CROSS-REFERENCE TO RELATED APPLICATIONS

This application claims priority to U.S. Provisional Patent Application Ser. No. 61/741,163 filed Jul. 13, 2012, entitled, "MOBILE COMPUTING DEVICE INCLUDING AN ERGONOMIC HANDLE," the contents of which are expressly incorporated herein by reference in their entirety.

TECHNICAL FIELD

The present disclosure relates generally to an adapter for a mobile device. More specifically, the invention relates to an adapter for improving ergonomics and adding functionality to the mobile device.

BACKGROUND

A mobile device, such as a smart phone, having a rectangular shape is generally held in a palm of a user's hand. The user interacts with the mobile device using a finger of the other hand or a stylus held in the other hand. In a texting use case, the thumbs of both hands can be used to type on a small keypad or a graphical user interface of the mobile device while the other fingers support the mobile device from the back side of the device.

SUMMARY

In one aspect, the invention is embodied in an adapter for a mobile device. The adapter includes a handle portion having a trigger switch that is accessible to an index finger of a hand of the user when the handle portion is held in the hand of the user. A cradle portion is positioned above the handle portion. The cradle portion receives at least a portion of the mobile device such that a plane of a display of the mobile device is substantially aligned with a long axis of the handle portion and the display is viewable by the user when the mobile device is positioned in the cradle portion and the handle portion is held in the hand of the user. A data acquisition device is coupled to the cradle portion. The data acquisition device acquires data from an object upon actuation of the trigger switch.

In one embodiment, the cradle portion also includes a connector that mates with a connector of the mobile device when the mobile device is positioned in the cradle portion. The handle portion can be shaped to receive a battery. In alternate embodiments, the data acquisition device is chosen from the group comprising a laser scanner, an imager, and a radio-frequency identification (RFID) reader.

The display of the mobile device can be a touch screen display. The adapter can include a processor that communicates with a processor of the mobile device when the mobile device is positioned in the cradle portion. The cradle portion can also include a transceiver for wirelessly communicating with a remote device.

The adapter can also include a memory for storing a software application. In one embodiment, the mobile device can be configured by the software application when the mobile device is positioned in the cradle portion.

In another aspect, the invention is embodied in a method for fabricating an adapter for a mobile device. The method includes forming a handle portion. A trigger switch is coupled to the handle portion such that the trigger switch is accessible to an index finger of a hand of the user when the handle portion is held in the hand of the user. A cradle portion is formed above the handle portion. The cradle portion is shaped to receive at least a portion of a mobile device such that a plane of a display of the mobile device is substantially aligned with a long axis of the handle portion and the display is viewable by the user when the mobile device is positioned in the cradle portion and the handle portion is held in the hand of the user. A data acquisition device is coupled to the cradle portion such that the data acquisition device is adapted to acquire data from an object upon actuation of the trigger switch.

The method can also include coupling a connector to the cradle portion that mates with a connector of the mobile device when the mobile device is positioned in the cradle portion. In one embodiment, the method also includes forming a cavity in the handle portion that is shaped to receive a battery. A sensor can be coupled to the handle portion. The sensor detects when the handle portion is positioned in a holster.

In yet another aspect, the invention is embodied in a system including a mobile computer and an adapter. The mobile computer includes a display and a connector accessible from a housing of the mobile computer. The adapter is removably coupled to the mobile device. The adapter includes a handle portion having a trigger switch that is accessible to an index finger of a hand of the user when the handle portion is held in the hand of the user. A cradle portion is positioned above the handle portion for receiving at least a portion of the mobile device such that a plane of the display of the mobile device is substantially aligned with a long axis of the handle portion and the display is viewable by the user when the mobile device is positioned in the cradle portion and the handle portion is held in the hand of the user. The cradle portion includes a connector that mates with the connector of the mobile device when the mobile device is positioned in the cradle portion. A data acquisition device is coupled to the cradle portion. The data acquisition device acquires data from an object upon actuation of the trigger switch. The data is transmitted to the mobile device.

In one embodiment, the data can be transmitted to the mobile device though the connector of the mobile device. The adapter can also include a transceiver for wirelessly communicating with a transceiver of the mobile device. The adapter can also include battery positioned in the handle portion. The data acquisition device can be chosen from the group comprising a laser scanner, an imager, and a radio-frequency identification (RFID) reader.

In one embodiment, the adapter can include a processor that communicates with a processor of the mobile device when the mobile device is positioned in the cradle portion. The adapter can also include a memory for storing a software application. The mobile device is configured by the software application when the mobile device is positioned in the cradle portion. The display of the mobile device can be a touch screen display.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to the manufacture and use of device sleds, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to device sleds or adapters for receiving or docking mobile devices. The adapter includes a handle portion having a trigger switch that is accessible to an index finger of a hand of the user when the handle portion is held in the hand of the user. A cradle portion is positioned above the handle portion. The cradle portion receives a portion of the mobile device. A plane of a display of the mobile device is substantially aligned with a long axis of the handle portion and the display is viewable by the user when the mobile device is positioned in the cradle portion and the handle portion is held in the hand of the user. A data acquisition device is coupled to the cradle portion. The data acquisition device acquires data from an object upon actuation of the trigger switch.

Figure 1:
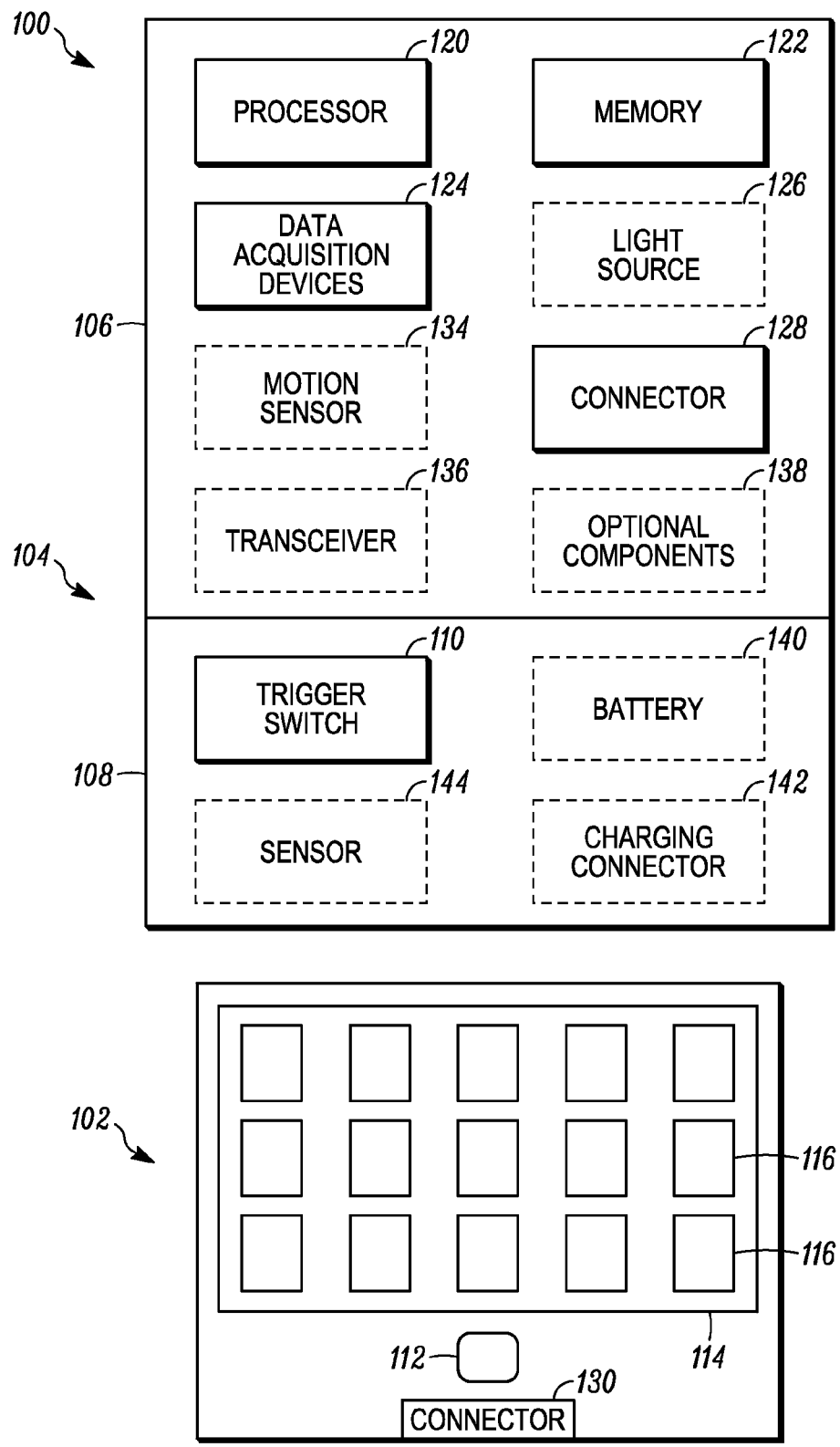
FIG. 1 illustrates a block diagram of the components of an adapter for a mobile device according to one embodiment of the invention.

FIG. 1 illustrates a block diagram of the components of an adapter 100 for a mobile device 102 according to one embodiment of the invention. The adapter 100 includes a housing 104 having a cradle portion 106 and a handle portion 108. The cradle portion 106 is situated above the handle portion 108. The handle portion 108 includes a trigger switch 110.

The mobile device 102 can include one or more control switches 112 for controlling different functions of the mobile device 102. A display 114 of the mobile device 102 can display a graphical user interface (GUI) including one or more icons 116. The icons 116 can be programmed to correspond to different functions of the mobile device 102.

A processor of the mobile device 102 can provide conventional functionalities for the mobile device 102. In a specific example according to the exemplary embodiments of the present invention and as will be described in further detail below, the mobile device 102 can include a plurality of software applications that are executed on the processor such as a software application related to capturing and processing data, images, documents and video. A memory can also provide conventional functionalities for the mobile device 102. For example, a memory can store data and software applications related to operations performed by the processor of the mobile device.

The display 114 can be any component configured to display data to a user. The display 114 can include, for example, a liquid crystal display (LCD). The display 114 can also include touch screen capability to enable the user to enter inputs directly on the display 114. A transceiver of the mobile device 102 can provide the mobile device 102 with a method of exchanging data with a communications network.

The processor can generate the graphical user interface (GUI) including the icons 116 on the display 114 corresponding to certain functionality of the mobile device 102.

The cradle portion 106 generally includes a processor 120 and a memory 122. The processor 120 can be used to execute software applications stored on the memory 122. The memory 122 can be any suitable memory, such as read-only memory (ROM), random access memory (RAM), flash memory, disk drive memory, or any other suitable storage technology.

A data acquisition device 124 is positioned in the cradle portion 106. The data acquisition device 124 can acquire data from an object. For example, the data acquisition device 124 can be an image capture device, a laser scanner, a radio-frequency identification (RFID) module or a combination of multiple data acquisition devices 124. In one embodiment, when the data acquisition device 124 is an imager, the cradle portion 106 can also include a light source 126. The light source 126 can illuminate an object being captured by the imager.

In one embodiment, the imager can be any component configured to capture image data. For example, the imager can include any type of image sensor or sensors. The imager can capture an image in a field of view (FoV) of the imager. In one embodiment, the image captured in the FoV of the imager can be displayed on a display 114 of the mobile device 102.

The cradle portion 106 also includes a connector 128. The connector 128 is configured to mate with a connector 130 of a mobile device 102 that is docked in the cradle portion 106. For example, the connector 130 of the mobile device 102 is accessible externally from the bottom of the housing of the mobile device 102 and can be mated with a corresponding connector 128 that is positioned at the base of the cradle portion 106. The cradle portion 106 can be fitted with the appropriate connector for each corresponding mobile device 102. The adapter 100 can control one or more functions of the mobile device 102 when the mobile device 102 is docked in the cradle portion 106. For example, the mobile device 102 can be preconfigured to sense when it is docked in the adapter 100.

In one embodiment, a docking application is preloaded into the mobile device 102 prior to the docking operation. Alternatively, the docking application can be loading onto the mobile device 102 via the adapter 100 when the mobile device 102 is inserted or positioned into the adapter 100. The docking application can be used to configure the mobile device 102 for use with the adapter 100. For example, the docking application configures the mobile device 102 to recognize an activation of the trigger switch 110 of the adapter 100. The activation of the trigger switch 110 can initiate a data capture function of the data acquisition device 124. In one embodiment, the captured data is transmitted to the mobile device 102 for further processing via the adapter 100.

In one embodiment, the cradle portion 106 can also include a motion sensor 134. The motion sensor 134 can detect a change in the orientation and position of the adapter 100. For example, the motion sensor 134 can generate motion data that indicates if a user moves the handle portion 108 of the adapter 100 from a vertical orientation to a horizontal orientation. The processor 120 can process the motion data and instruct a processor of the mobile device 102 to re-orient the display 114 of the mobile device 102 from a portrait mode to a landscape mode. When the mobile device 102 is equipped with an integrated motion sensor, the motion sensor 134 in the adapter 100 can be used to detect other motion, such as physical abuse or docking, for example.

In one embodiment, the cradle portion 106 can also include an optional transceiver 136. The transceiver 136 is coupled to the processor 120 and can wirelessly communicate with the mobile device 102 and/or a remote device. For example, data captured using the data acquisition device 124 can be wireless transmitted to the mobile device 102 and/or a remote device using the transceiver 136. The transceiver 136 can be any suitable radio device that communicates over a network. For example, the transceiver 136 can connect to the mobile device and/or another remote device over a personal area network (PAN), such as Bluetooth® or a wireless local area network (WLAN).

The cradle portion 106 can also include optional components 138 that increase the functionality of the adapter 100. For example, the optional components can be one or more light emitting diodes (LEDs). The LEDs can indicate a successful data capture event. In one embodiment, the LEDs can indicate a charging status of a mobile device positioned in the cradle portion 106. In one embodiment, an optional component can include a pointing device located on the cradle portion 106 such that the pointing device is accessible by a thumb of a user holding the adapter 100 by the handle portion 108. The pointing device can manipulate a mouse pointer displayed on the mobile device 102 when the mobile device 102 is positioned in the cradle portion 106. The pointing device can be a pointing stick, trackball, touch pad, or any other suitable pointing device.

In general, the handle portion 108 is in the form of a pistol grip. The handle portion 108 includes the trigger switch 110. The trigger switch 110 can activate the data acquisition device 124. The trigger switch 110 can also be used to control one or more functions of the mobile device 102 positioned in the cradle portion 106. The trigger switch 110 is positioned on the handle portion 108 such that it is accessible to an index finger of a hand of a user when the handle portion 108 is held in the hand of the user.

The handle portion 108 can be shaped to receive an optional battery 140. For example, the handle portion 108 can include a cavity that is configured to accept the battery 140. In one embodiment, the handle portion 108 can also include an optional charging/data connector 142 for charging the battery 140 and/or transferring data to/from the mobile device 102. The optional charging/data connector 142 can be situated under the handle portion 108. In one embodiment, the handle portion 108 can be docked with a charging cradle (not shown) having a connector which mates with the charging/data connector 142 in the handle portion 108.

The handle portion 108 can also include an optional sensor 144. The sensor 144 can be a photodetector that detects changes in illumination perceived by the sensor 144. However, any suitable sensor can be used in practice. For example, the sensor 144 can detect when the handle portion 108 is inserted into a holster that covers the sensor 144. In one embodiment, the sensor 144 can detect when the handle portion 108 is held in the hand of a user. The sensor 144 can generate sensor data. The processor 120 in the adapter 100 or mobile device 102 can change an operation of the mobile device 102 in response to the sensor data. For example, the adapter 100 with the mobile device 102 can automatically enter a hands-free presentation mode when the sensor 144 detects that the adapter 100 is positioned in the holster.

Figure 2:
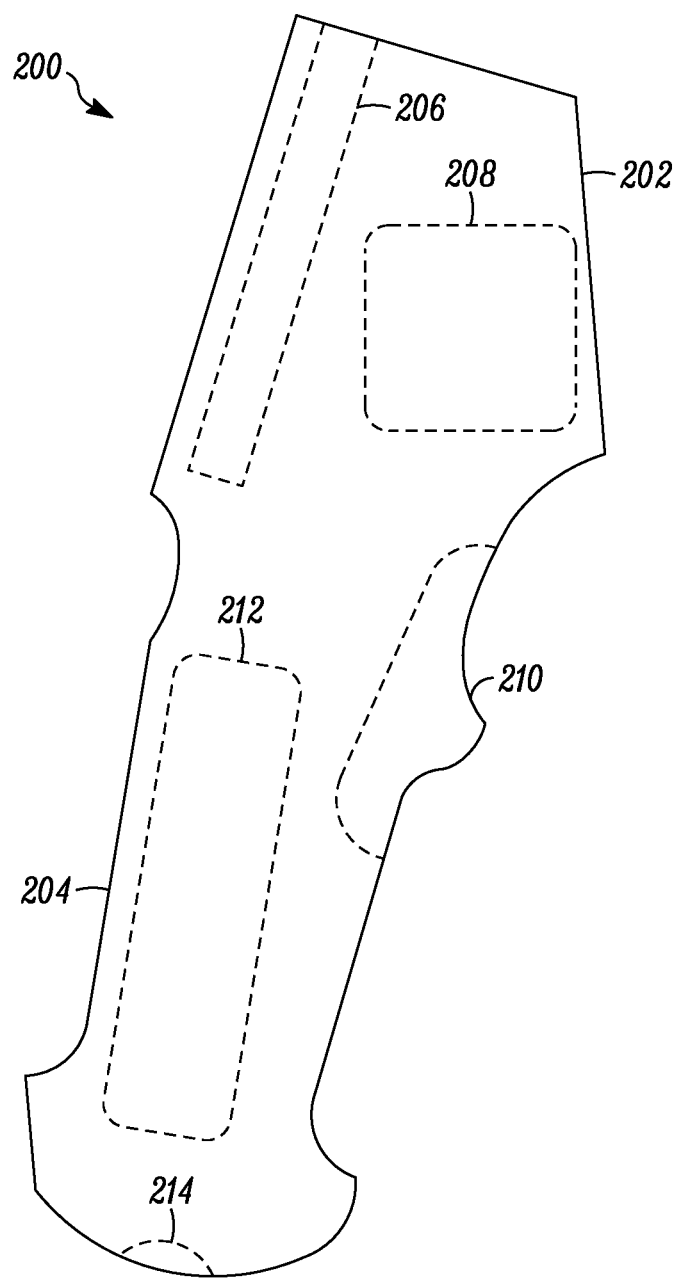
FIG. 2 illustrates a cross-sectional view of an exemplary adapter according to the invention.

FIG. 2 illustrates a cross-sectional view of an exemplary adapter 200 according to the invention. The adapter 200 includes a cradle portion 202 and a handle portion 204. The cradle portion 202 includes a slot 206 that is configured to receive a mobile device (not shown). A connector (not shown) is positioned at the base of the cradle portion 202. The connector mates with a connector of the mobile device. The connector can pass data and power signals between the adapter 200 and the mobile device.

The cradle portion 202 can also include a data acquisition device 208. The data acquisition device 208 can be a laser scanner, an image capture device, or a radio-frequency identification (RFID) device. In one embodiment, the data acquisition device 208 is situated adjacent to the slot 206.

The handle portion 204 includes a trigger switch 210. The trigger switch 210 can be a momentary switch, such as single pole momentary switch. In one embodiment, the trigger switch 210 can be a double pole switch. Each switch in a double pole switch can activate a different function of the adapter 200 and/or a mobile device positioned in the adapter 200.

The handle portion 204 can also include a cavity 212 for receiving a battery. The battery can be a disposable battery or a rechargeable battery. The handle portion 204 can also include a charging connector 214. The charging connector 214 can be used to charge the battery and/or a battery in a mobile device inserted in the cradle portion 202.

Figure 3:
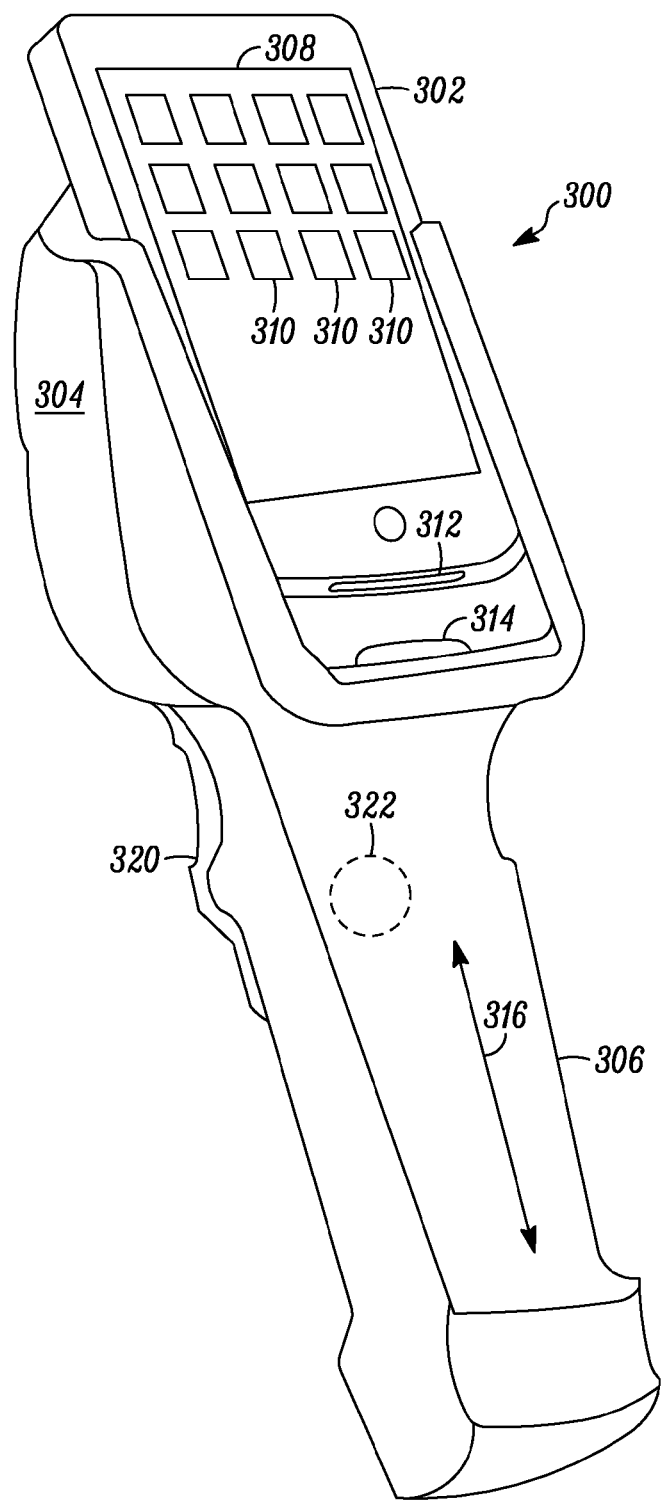
FIG. 3 illustrates an adapter with a mobile device according to one embodiment of the invention.

FIG. 3 illustrates an adapter 300 with a mobile device 302 according to one embodiment of the invention. The adapter 300 includes a cradle portion 304 and a handle portion 306. The cradle portion 304 is adapted to receive the mobile device 302.

The mobile device 302 can be a mobile computer, a cellular (smart) telephone, a personal digital assistant (PDA), or any other suitable device. In one embodiment, the mobile device 302 can include a touchscreen display 308. One or more icons 310 can be displayed on the display 308. The icons 310 can correspond to different software applications or functions that can be executed on the mobile device 302. The mobile device 302 can include other graphical user interfaces.

The mobile device 302 includes a connector 312 that is externally accessible. The connector 312 can be used to provide/receive power and data to/from the mobile device 302. The connector 312 mates with a connector 314 situated in the cradle portion 304.

In operation, a user inserts the mobile device 302 into the cradle portion 304 and couples the connector 312 with the connector 314. The mobile device 302 is positioned such that a plane of the display 308 of the mobile device 302 is substantially aligned with a long axis 316 of the handle portion 306 and the display 308 is viewable by the user when the mobile device 302 is positioned in the cradle portion 304 and the handle portion 306 is held in the hand of the user.

The handle portion 306 includes a trigger switch 320 that is accessible to an index finger of a hand of the user when the handle portion 306 is held in the hand of the user. The handle portion 306 can also include a sensor 322 that senses when the user holds the adapter 300. The sensor 322 can also determine when the adapter 300 is held in a holster (not shown). The mobile device 302 can automatically switch to a predetermined mode of operation in response to output signals from the sensor 322.

Figure 4:
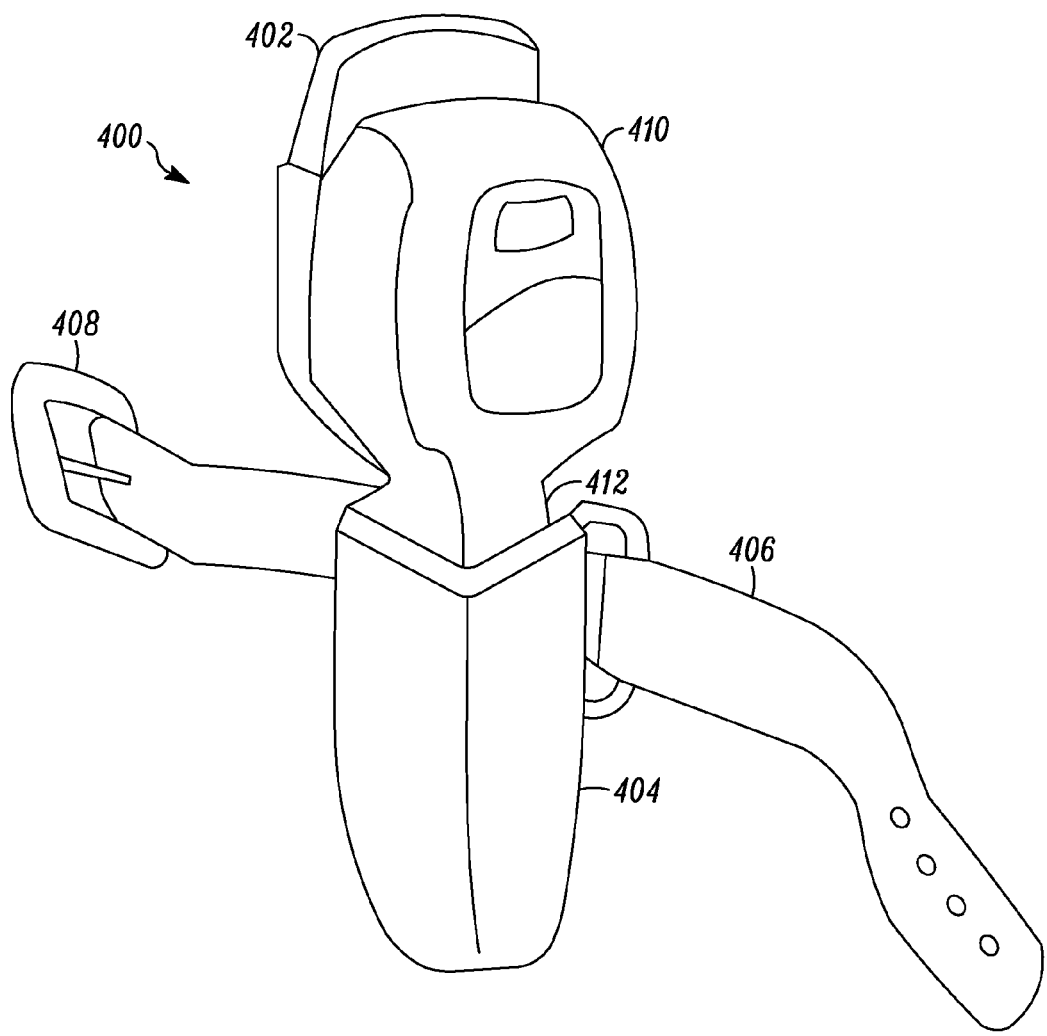
FIG. 4 illustrates an adapter with a mobile device in a holster according to one embodiment of the invention.

FIG. 4 illustrates an adapter 400 with a mobile device 402 in a holster 404 according to one embodiment of the invention. The holster 404 is shaped to receive the adapter 400. The holster 404 can be fabricated from a flexible material, such as nylon fabric, plastic, leather, or any other suitable material.

The holster 404 can be coupled to a belt 406. The belt 406 can include a buckle 408 for adjusting the length of the belt 406. For example, the belt 406 can be worn around a hip, a torso, or a shoulder of a user. In one embodiment, the holster 404 can be used to carry the adapter 400 including the mobile device 402. The holster 404 can position the adapter 400 such that the data acquisition device 202 (FIG. 2) is positioned to capture data in a hands-free presentation mode of operation.

In one embodiment, the adapter 400 can be fabricated by forming a cradle portion 410 and the handle portion 412 in a single molded piece of material. The trigger switch (not shown) is positioned on the handle portion 412 of the adapter 400. The trigger switch is accessible to an index finger of a hand of a user when the handle portion 412 is held in the hand of the user.

In one embodiment, the trigger switch actuates at least one function of the adapter 400 and/or the mobile device 402. For example, the trigger switch can activate a data capture function of the adapter 400. In another embodiment, the trigger switch can select an option highlighted by a cursor viewable on the display (not shown) of the mobile device 402. In one embodiment, the combination of the adapter 400 and the mobile device 402 is configured for single hand control.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. An adapter for a mobile device, comprising:
a handle portion having comprising a trigger switch that is accessible to an index finger of a hand of the user when the handle portion is held in the hand of the user;
a cradle portion positioned above the handle portion configured to receive at least a portion of the mobile device in a slot such that a plane of a display of the mobile device is substantially aligned with a long axis of the handle portion in a fixed position and the display is viewable by the user when the mobile device is positioned in the slot of the cradle portion and the handle portion is held in the hand of the user, the cradle portion comprising: a data acquisition device adjacent to the slot coupled to the cradle portion, the data acquisition device configured to acquire data from an object upon actuation of the trigger switch, wherein the cradle portion further comprises a memory configured to store a software docking application, the mobile device being configured by the software docking application being loaded onto the mobile device by the adapter when the mobile device is positioned in the cradle portion, the docking application configuring the mobile device to recognize an activation of the trigger switch; and
a processor configured to communicate with a processor of the mobile device when the mobile device is positioned in the cradle portion, wherein, upon actuation of the trigger switch: the data acquisition device acquires the data from the object; and, the data acquired by the data acquisition device is transmitted to the mobile device for processing.

2. The adapter of claim 1 wherein the cradle portion further comprises a connector in the slot that mates with a connector of the mobile device when the mobile device is positioned in the cradle portion.

3. The adapter of claim 1 wherein the handle portion is shaped to receive a battery.

4. The adapter of claim 1 wherein the data acquisition device is chosen from the group comprising a laser scanner, an imager, and a radio-frequency identification (RFID) reader.

5. The adapter of claim 1 wherein the display of the mobile device comprises a touch screen display.

6. The adapter of claim 1, further comprising:
a pointing device coupled to the cradle portion, the pointing device manipulating a mouse pointer displayed on the display of the mobile device when the mobile device is positioned in the cradle portion.

7. The adapter of claim 1, further comprising:
a transceiver configured to wirelessly communicate with a transceiver of the mobile device, the data being transmitted to the mobile device using the transceiver.

8. A method for fabricating an adapter for a mobile device, comprising:
forming a handle portion;
coupling a trigger switch to the handle portion such that the trigger switch is accessible to an index finger of a hand of the user when the handle portion is held in the hand of the user;
forming a cradle portion above the handle portion, the cradle portion being shaped to receive at least a portion of a mobile device in a slot such that a plane of a display of the mobile device is substantially aligned with a long axis of the handle portion and the display is viewable by the user when the mobile device is positioned in the cradle portion and the handle portion is held in the hand of the user; coupling integrating a data acquisition device into the cradle portion such that the data acquisition device acquires data from an object upon actuation of the trigger switch, the cradle portion further comprising a memory operable for storing a docking application, the docking application being loaded onto the mobile device by the adapter when the mobile device is positioned in the cradle portion, the docking application configuring the mobile device to recognize an activation of the trigger switch; and integrating a processor into the adapter, the processor configured to communicates with a processor of the mobile device when the mobile device is positioned in the slot of the cradle portion, wherein, upon actuation of the trigger switch: the data acquisition device acquires the data from the object, wherein the data acquired by the data acquisition device is transmitted to the mobile device for processing.

9. The method of claim 8 further comprising coupling a connector in the slot of the cradle portion that mates with a connector of the mobile device when the mobile device is positioned in the cradle portion.

10. The method of claim 8 further comprising forming a cavity in the handle portion that is shaped to receive a battery.

11. The method of claim 8 further comprising coupling a sensor to the handle portion, the sensor detecting when the handle portion is positioned in a holster.

12. A system, comprising:

a mobile device comprising a display and a connector accessible from a housing of the mobile device; and an adapter for removably coupling to the mobile device, the adapter comprising, a handle portion having comprising a trigger switch that is accessible to an index finger of a hand of the user when the handle portion is held in the hand of the user;

a cradle portion positioned above the handle portion configured to receive at least a portion of the mobile device in a slot such that a plane of the display of the mobile device is substantially aligned with a long axis of the handle portion and the display is viewable by the user when the mobile device is positioned in the slot of the cradle portion and the handle portion is held in the hand of the user, the cradle portion having a connector that mates with the connector of the mobile device when the mobile device is positioned in the cradle portion, the cradle portion comprising a data acquisition device adjacent to the slot coupled to the cradle portion, the data acquisition device configured to acquire data from an object upon actuation of the trigger switch, the data being transmitted to the mobile device, wherein the adapter further comprises a memory for storing a software application, the mobile device being configured by the software application when the mobile device is positioned in the cradle portion, and wherein the cradle portion further comprises a memory storing a docking application, the docking application being loaded onto the mobile device by the adaptor when the mobile device is positioned in the cradle portion, the docking application configuring the mobile device to recognize an activation of the trigger switch; and a processor that communicates with a processor of the mobile device when the mobile device is positioned in the cradle portion, wherein, upon actuation of the trigger switch: the data acquisition device acquires the data from the object; and, the data acquired by the data acquisition device is transmitted to the mobile device for processing.

13. The system of claim 12 wherein the data is transmitted to the mobile device though the connector of the mobile device.

14. The system of claim 12 wherein the adapter further comprises a transceiver configured to wirelessly communicate with a transceiver of the mobile device, the data being transmitted to the mobile device using the transceiver.

15. The system of claim 12 further comprising a battery positioned in the handle portion.

16. The system of claim 12 wherein the data acquisition device is chosen from the group comprising a laser scanner, an imager, and a radio-frequency identification (RFID) reader.

17. The system of claim 12 wherein the display of the mobile device comprises a touch screen display.

\* \* \* \* \*